United States Patent
Le Dren et al.

(10) Patent No.: US 9,777,834 B2
(45) Date of Patent: Oct. 3, 2017

(54) BOOSTER DEVICE COMPRISING A HYDRAULIC MOTOR DRIVING A BOOSTER PUMP

(71) Applicant: TECHNOBOOST, Paris (FR)

(72) Inventors: Arnaud Le Dren, Brunoy (FR); Frederic Joubert, Colombes (FR); Arnaud Mlinaric, Livilliers (FR)

(73) Assignee: Technoboost, Paris (FR)

( * ) Notice: Subject to any disclaimer, the term of this patent is extended or adjusted under 35 U.S.C. 154(b) by 55 days.

(21) Appl. No.: 14/898,723

(22) PCT Filed: Jun. 10, 2014

(86) PCT No.: PCT/FR2014/051392
§ 371 (c)(1),
(2) Date: Dec. 15, 2015

(87) PCT Pub. No.: WO2014/202864
PCT Pub. Date: Dec. 24, 2014

(65) Prior Publication Data
US 2016/0138711 A1    May 19, 2016

(30) Foreign Application Priority Data

Jun. 17, 2013  (FR) ...................... 13 55643

(51) Int. Cl.
| F16H 61/00 | (2006.01) |
| F16H 61/4139 | (2010.01) |
| B60K 6/12 | (2006.01) |
| B60K 17/356 | (2006.01) |
| F04B 9/10 | (2006.01) |
| F04B 49/00 | (2006.01) |
| F03C 1/26 | (2006.01) |
| F16H 39/34 | (2006.01) |
| F16H 39/36 | (2006.01) |

(52) U.S. Cl.
CPC ......... F16H 61/4139 (2013.01); B60K 6/12 (2013.01); B60K 17/356 (2013.01); F03C 1/26 (2013.01);
(Continued)

(58) Field of Classification Search
CPC ........................ F16H 39/34; F16H 61/4139
(Continued)

(56) References Cited

U.S. PATENT DOCUMENTS 6,973,782 B2 * 12/2005 Rose ................ F15B 11/17
60/414
7,107,767 B2   9/2006 Frazer et al.
(Continued)

FOREIGN PATENT DOCUMENTS

DE  102009011274 A1  9/2010
FR  WO2011045519 A1  4/2011
(Continued)

OTHER PUBLICATIONS

International Search Report of corresponding application PCT/FR2014/051392 dated Aug. 13, 2014.

*Primary Examiner* — Thomas E Lazo
(74) *Attorney, Agent, or Firm* — Polster, Lieder, Woodruff & Lucchesi, LC

(57) ABSTRACT

A booster device for a hydraulic circuit comprising a high-pressure circuit (12) and a low-pressure circuit (16) connected to a system generating the high pressure and to receivers, said booster device maintaining a minimum pressure in the low-pressure part, characterized in that it comprises a hydraulic motor (30) of which the inlet is connected to the high-pressure circuit (12) and the outlet to the low-pressure circuit (16), which drives a booster pump (20) sucking the fluid from a reservoir (24), in order to discharge it into this low-pressure circuit.

12 Claims, 1 Drawing Sheet

(52) U.S. Cl.
CPC .............. *F04B 9/10* (2013.01); *F04B 49/002* (2013.01); *F16H 39/34* (2013.01); *F16H 39/36* (2013.01)

(58) Field of Classification Search
USPC .......................................................... 60/413
See application file for complete search history.

(56) References Cited

U.S. PATENT DOCUMENTS

| | | | | |
|---|---|---|---|---|
| 7,770,696 | B2 * | 8/2010 | Futahashi | B66F 9/22 187/224 |
| 8,209,975 | B2 * | 7/2012 | Persson | F15B 1/024 60/413 |
| 8,429,907 | B2 * | 4/2013 | Gronli | F15B 21/14 60/414 |
| 8,726,645 | B2 * | 5/2014 | Shang | E02F 9/123 60/414 |
| 8,876,495 | B2 * | 11/2014 | Galloway | F15B 21/042 244/78.1 |
| 9,032,722 | B2 * | 5/2015 | Kawasaki | E02F 9/2075 60/414 |
| 2005/0132701 | A1 | 6/2005 | Rose | |
| 2010/0141024 | A1 | 6/2010 | Fouquet et al. | |
| 2010/0287922 | A1 | 11/2010 | Rosman | |
| 2013/0042602 | A1 * | 2/2013 | Gauthier | B60K 6/12 60/327 |

FOREIGN PATENT DOCUMENTS

| | | | | |
|---|---|---|---|---|
| FR | | 2978506 A1 | 2/2013 | |
| WO | WO 2012091942 A1 * | | 7/2012 | ............ F15B 21/042 |

* cited by examiner

BOOSTER DEVICE COMPRISING A HYDRAULIC MOTOR DRIVING A BOOSTER PUMP

CROSS-REFERENCE TO RELATED APPLICATIONS

The present application is the U.S. National Stage under 35 USC §371 of PCT/FR2014/051392, which in turn claims priority to French Application Number 1355643 which was filed on Jun. 17, 2013.

BACKGROUND

The present invention relates to a booster device for a hydraulic circuit, and a hydraulic circuit and a hydraulic hybrid automotive vehicle comprising such a booster device.

In general, hydraulic circuits comprise a system having a pump which draws fluid from a low pressure part of the circuit to generate pressure in a high pressure part of the circuit, the high pressure being stored in an high pressure accumulator in order to supply at least one receiver comprising a return line towards the low pressure part.

This type of hydraulic circuit, used in the industry or for different types of vehicles, in particular to provide traction to hydraulic hybrid automotive vehicles, can comprise a low pressure part maintained at a minimum pressure by a booster device in order to supply the pump at this minimum pressure to avoid cavitation of the fluid, in particular with the highest flows.

A known type of booster device comprises an accumulator pressurized by a gas, connected to the low pressure part of the circuit in order to maintain a minimum pressure in this part. However, the occupied space and mass of this accumulator are disadvantageous, in particular for an automotive vehicle. In addition, the pressure maintained by the gas is heavily dependent on the temperature and makes the functional parameters of the hydraulic circuit difficult to optimize.

Another known booster device, presented in particular in French Pat. No. FR2978506, comprises a booster pump drawing the fluid from a reservoir at atmospheric pressure, with the shaft aligned to the high pressure pump shaft and driven by an electric motor. This device requires an electric motor with its controls, which consumes electric energy and has a certain cost.

SUMMARY

The goal of the present invention is to eliminate the inconveniences of the prior art.

For this purpose a booster device for a hydraulic circuit is proposed which comprises a high pressure circuit and a low pressure circuit connected by a high pressure generating system and receivers. The booster device maintains a minimum pressure in the low pressure circuit, and is characterized in that it comprises a hydraulic motor having an inlet connected to the high pressure circuit and an outlet connected to the low pressure circuit. The hydraulic motor drives a booster pump which draws fluid from a reservoir and discharges it in the low pressure circuit.

One advantage of this booster device is that in a simple and inexpensive manner, with strictly hydraulic means, without electrical controls or electric energy consumption, a very stable booster pressure is obtained due to the self-regulation of the pressure supplied by the booster pump.

In addition, the booster device can comprise one or more of the following characteristics, which can be combined.

Advantageously, the hydraulic motor drives according to a constant speed ratio of the booster pump.

Advantageously, the booster pump and the hydraulic motor are dimensioned so that the product of the displacement of the pump with its rotational speed is equal to the product of the hydraulic motor displacement with its rotational speed, multiplied with a ratio K, whereby the ratio K is equal to difference between the high pressure and the low pressure, divided by the difference between the low pressure and the reservoir pressure.

According to one embodiment, the booster pump is driven by the hydraulic motor through a direct connection between the aligned shafts of these two machines.

According to another embodiment, the booster pump is driven by the hydraulic motor through a gear box comprising a constant gear ratio.

In addition, the low pressure circuit can include a booster pressure regulation valve, which releases the fluid above a certain pressure threshold to return it to the reservoir.

Advantageously, in the booster device, the hydraulic motor and the supply lines of the motor are dimensioned so that when the booster pump is blocked, the leakage flow in this motor is low.

A hydraulic circuit is also disclosed which has a low pressure circuit and a high pressure circuit connected to a high pressure generating system and receivers. This circuit comprises a booster device which maintains a minimum pressure in the booster device, and contains any one of the preceding characteristics.

In addition, a hybrid automotive vehicle can be provided with a hydraulic circuit having a high pressure circuit and a low pressure circuit connected to a high pressure generating system and receivers. This circuit comprises a booster device maintaining a minimum pressure in the low pressure circuit, including any one of the preceding characteristics.

DESCRIPTION OF THE DRAWINGS

The invention will be better understood and other characteristics and advantages will become more clear by reading the following description, given as an example and in non-limiting manner with reference to the attached drawings, in which.

DETAILED DESCRIPTION

Figure 1:
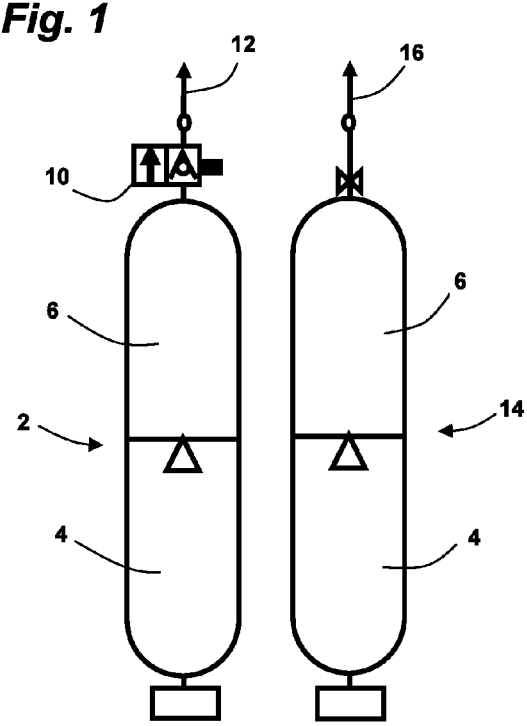
FIG. 1 is a schematic representation of a prior art booster system, comprising a high pressure accumulator and a low pressure accumulator.

FIG. 1 represents a hydraulic circuit with a high pressure accumulator 2 comprising a gas 4 under high pressure and a hydraulic chamber 6 which is permanently under pressure. The gas 4 and the hydraulic chamber 6 are separated by a flexible membrane. The hydraulic chamber is connected to a high pressure circuit 12 of the hydraulic circuit through a check valve 10.

The hydraulic circuit comprises a low pressure accumulator 14 containing a gas 4 under moderate pressure and a hydraulic chamber 6, wherein the gas 4 and hydraulic chamber 6 are separated in the same manner by a flexible membrane.

The low pressure accumulator 14 constitutes a booster device comprising the moderate pressure gas 4 permanently communicating this pressure to the low pressure part 16 of the hydraulic circuit. In this manner, the pump generating the high pressure of the circuit receives the fluid at the moderate pressure level, in order to permanently supply the pump, in particular for the highest flows and to avoid cavitation phenomena which could damage the pump.

The low pressure accumulator 14 constitutes a relatively heavy unit and occupies a lot of space, in particular if the goal is to have a significant fluid reserve. In addition, the booster pressure supplied by this accumulator 14 is heavily dependent on the fill level of its hydraulic chamber 6, which is complementary of the volume left free for the gas 4, and on the temperature of this gas.

Figure 2:
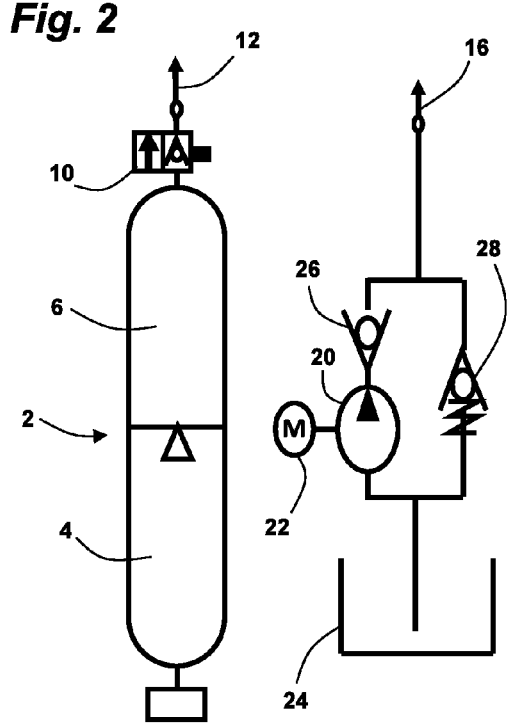
FIG. 2 is a schematic representation of a prior art booster system, comprising a booster pump driven by an electric motor.

FIG. 2 represents a hydraulic circuit comprising a high pressure accumulator 2 similar to the one shown in FIG. 1, and a booster device comprising a booster pump 20 driven by an electric motor 22. The booster pump 20 has an inlet drawing the fluid form a reservoir 24 at atmospheric pressure.

The booster pump 20 returns the moderate pressure fluid to the low pressure circuit 16. This low pressure circuit 16 comprises a bypass valve 28 regulating the booster pressure, and releases the fluid above a certain pressure level to send it back to the reservoir 24. In this way, a precise and stable booster pressure is obtained.

However, the electric motor 22 requires an electric energy source and a controller to deliver sufficient power to follow the dynamic stresses of the fluid consumption. The electrical consumption can be relatively high, in particular for high flow rates. In addition, this booster device is of a significant mass and cost, in particular for automotive vehicles for which these two points are critical.

Figure 3:
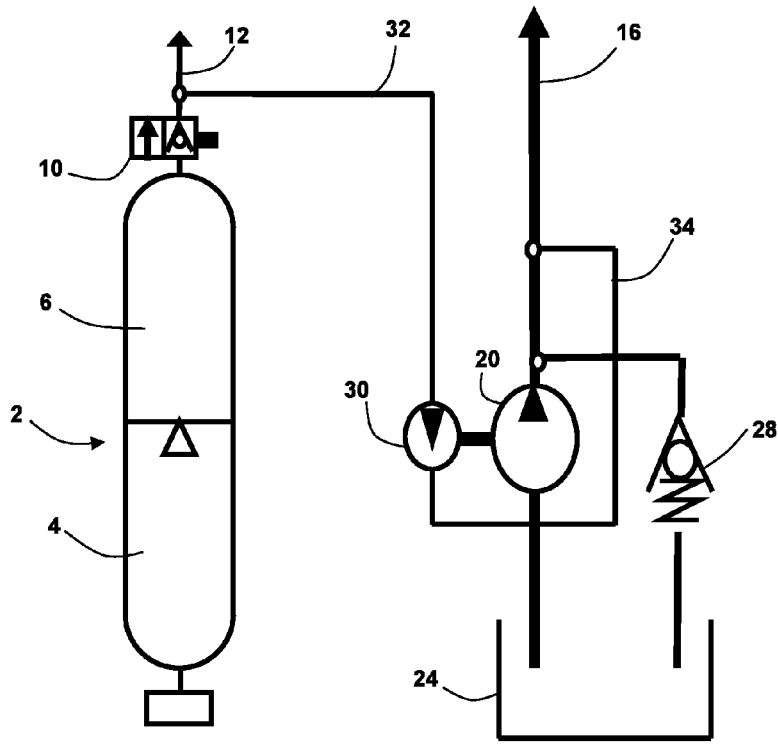
FIG. 3 is a schematic representation of the booster system according to the invention.

FIG. 3 represents a hydraulic circuit comprising high pressure accumulator 2 similar to the one shown in FIG. 1 and a booster device. The booster device comprises a booster pump 20 mechanically driven by a hydraulic motor 30 directly fed through a line 32 connected to the high pressure circuit 12. The outlet of the hydraulic motor 30 is connected to the low pressure circuit 16.

The booster pump 20 draws the fluid from the reservoir 24 at atmospheric pressure, and returns it at the moderate booster pressure to the low pressure circuit 16.

In particular, the mechanical connection between the hydraulic motor 30 and the booster pump 20, can be made in a simple manner by direct coupling of the aligned shafts of these two machines, so that their rotational speeds are the same. The connection can also be made through a gear box with constant gear ratio, giving proportional speeds between these two machines.

The power of the hydraulic motor 30 depends on the pressure difference between the high pressure circuit 12 and the low pressure circuit 16.

The supply line 32 of the hydraulic motor 30 and the outlet line 34 can have a small cross-section, since the flow rate of fluid extracted from the high pressure circuit 12 to supply the hydraulic motor is low, similar to a leak flow. The suction and return lines of the booster pump 20 have a larger diameter because the flow rate can be high.

The hydraulic motor 30 and the booster pump 20 are dimensioned for identical power levels, with high inlet pressure and low flow rate for the motor, and with low return pressure and high flow rate for the pump. In practice, the product of the displacement of the booster pump 20 with its rotational speed is equal to the product of the displacement of the hydraulic motor 30 with its rotational speed, multiplied by a ratio K. Neglecting the losses, the flows of these two machines are therefore also proportional according to the same ratio K.

The inertia of the mechanical unit comprising the rotors of the hydraulic motor 30 and the booster pump 20 is low, so that a very rapid dynamic response is obtained as a function of the differences between the high pressure and low pressure coupled to this motor.

The low pressure circuit 16 optionally comprises a booster pressure regulating valve 28, which releases the fluid above a certain pressure threshold, to return the fluid to the reservoir 24.

The booster device automatically regulates the booster pressure which tends to converge towards equilibrium and, operates as follows.

When the power of the two machines is equal, the difference between high pressure (Php) and low pressure (Pbp) connected to the hydraulic motor 30, divided by the difference between the low pressure (Pbp) and the reservoir pressure (Pres) connected to the booster pump 20, is equal to the ratio K:

$$\frac{(Php - Pbp)}{(PbP - Pres)} = K$$

from which is deduced that:

$$Pbp = \frac{1}{(K+1)} Php + \frac{K}{(K+1)} Pres$$

With the reservoir pressure being null, the low pressure Pbp varies therefore in the same proportion as the high pressure Php. If the low pressure Php is higher than its normal value, the charge of the booster pump 20 increases and the pressure difference seen by the hydraulic motor 30 decreases. These two factors reduce the speed of the motor, lowering the flow and the low pressure.

If the low pressure Pbp is lower than its nominal value the opposite occurs; the charge of the booster pump 20 and the pressure difference seen by the hydraulic motor increase. These two factors make the motor accelerate, increasing the flow as well as the low pressure. The system is self-regulating.

The need to recharge the hydraulic circuit with fluid, drawn from the reservoir 24 for operating the booster pump 20, is linked to the lost flow in the different devices of this circuit which lose fluid to return the lost fluid to the reservoir.

It is to be noted in addition that when the booster pump 20 rotates as a result of the low pressure being too low, the pump draws fluid from the high pressure circuit 12, passing through the hydraulic motor 30, which then supplies the low pressure. This passage improves the dynamics of the system by raising the pressure in the low pressure circuit 16 more rapidly.

In particular, the hydraulic motor 30 and the supply lines are dimensioned so that when the booster pump 20 is blocked, the leak flow in this motor is low. The yield of this booster system is optimized, because it is permanently adjusted as a function of the losses in the whole hydraulic circuit.

As a variant, another source of high pressure can be used to power the hydraulic motor 30, which can be in particular a control pressure from a device of this hydraulic circuit.

In this simple and inexpensive manner, using only hydraulic elements and without using electric power, a booster device is obtained which maintains a precise pressure regardless of the operational conditions. With this device the operation of a hydraulic circuit can be optimized, in particular for a hybrid vehicle, in order to reduce its energy consumption.

The invention claimed is:

1. A booster device for a hydraulic circuit comprising a high pressure circuit and a low pressure circuit connected to a high pressure generating system and receivers, wherein the booster device maintains a minimum pressure in the low pressure circuit, said booster device comprising a hydraulic motor having an inlet connected to the high pressure circuit and an outlet connected to the low pressure circuit, the motor driving a booster pump; said booster pump having a pump inlet in communication with a reservoir and a pump outlet in communication with the low pressure circuit, whereby, the booster pump withdraws fluid from the reservoir to return the fluid to the low pressure circuit.

2. The booster device according to claim 1, wherein the hydraulic motor drives the booster pump according to a constant speed ratio.

3. The booster device according to claim 2, wherein the booster pump and the hydraulic motor are dimensioned so that the product of the pump displacement with its rotational speed is equal to the product of the motor displacement with its rotational speed, multiplied by a ratio K, wherein K is equal to the difference between the high pressure (Php) and the low pressure (Pbp) divided by the difference between the low pressure (Pbp) and the reservoir pressure (Pres), i.e., $$\frac{(Php - Pbp)}{(PbP - Pres)} = K.$$

4. The booster device according to claim 2, wherein the hydraulic motor drives the booster pump through a direct coupling of the aligned shafts of these two machine.

5. The booster device according to claim 2, characterized in that the hydraulic motor drives the booster pump through a gear box comprising a constant gear ratio.

6. The booster device according to claim 1, wherein the low pressure circuit comprises a regulating valve for the booster pressure, the regulating valve releasing the fluid above a certain pressure threshold in order to return the fluid to the reservoir.

7. The booster device according to claim 1, wherein the hydraulic motor and the lines supplying the motor are dimensioned so that when the booster pump is blocked the leak flow in the motor is low.

8. A hydraulic circuit having a high pressure circuit and a low pressure circuit connected to a high pressure generating system and to receivers, this circuit comprises the booster device of claim 1, the booster device maintaining a minimum pressure in the low pressure circuit.

9. A hybrid automotive vehicle comprising a hydraulic circuit having a high pressure circuit and a low pressure circuit connected to a high pressure generating system and to receivers, the circuit comprising the booster device of claim 1, the booster device maintaining a minimum pressure in the low pressure circuit.

10. A booster device for a hydraulic circuit comprising a high pressure circuit, a low pressure circuit, a reservoir, a hydraulic motor having an inlet and an outlet, a booster pump having an inlet and an outlet, wherein said hydraulic motor is mechanically connected to said pump to drive said pump;
wherein said inlet of said hydraulic motor is in communication with said high pressure circuit and an outlet of said hydraulic motor is connected directly to said low pressure circuit downstream of the outlet of said pump; and
wherein said inlet of said pump is in communication with said reservoir, and said outlet of said pump is in communication with said low pressure circuit, such that said pump withdraws fluid from the reservoir to return the fluid to the low pressure circuit.

11. The booster device of claim 10, wherein the booster pump and the hydraulic motor are dimensioned so that the product of the pump displacement with its rotational speed is equal to the product of the motor displacement with its rotational speed, multiplied by a ratio K, wherein K is derived from the flowing equation:

$$K = \frac{(Php - Pbp)}{(PbP - Pres)},$$

wherein:
Php is pressure in the high pressure circuit,
Pbp is the pressure in the low pressure circuit, and
Pres is the pressure in the reservoir.

12. A booster device for a hydraulic circuit comprising a high pressure circuit and a low pressure circuit connected to a high pressure generating system and receivers, wherein the booster device maintains a minimum pressure in the low pressure circuit, said booster device comprising a hydraulic motor having an inlet connected to the high pressure circuit and an outlet connected to the low pressure circuit, the motor driving a booster pump; said booster pump having a pump inlet in communication with a reservoir and a pump outlet in communication with the low pressure circuit, whereby, the booster pump withdraws fluid from the reservoir to return the fluid to the low pressure circuit;
wherein the hydraulic motor drives the booster pump according to a constant speed ratio and wherein the booster pump and the hydraulic motor are dimensioned so that the product of the pump displacement with its rotational speed is equal to the product of the motor displacement with its rotational speed, multiplied by a ratio K, wherein K is equal to the difference between the high pressure (Php) and the low pressure (Pbp) divided by the difference between the low pressure (Pbp) and the reservoir pressure (Pres), i.e., $$\frac{(Php - Pbp)}{(PbP - Pres)} = K.$$

* * * * *